United States Patent
Shikata et al.

(10) Patent No.: US 6,641,195 B2
(45) Date of Patent: Nov. 4, 2003

(54) VEHICULAR COCKPIT MODULE ASSEMBLY AND ASSEMBLING METHOD

(75) Inventors: Kazushi Shikata, Kariya (JP); Kenichi Mori, Nagoya (JP); Masakazu Watanabe, Nagoya (JP); Eiichi Kamei, Nisshin (JP); Hikaru Sugi, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/862,634

(22) Filed: May 22, 2001

(65) Prior Publication Data

US 2002/0017798 A1 Feb. 14, 2002

(30) Foreign Application Priority Data

May 23, 2000 (JP) ........................................ 2000-151958

(51) Int. Cl.[7] .............................................. B62D 25/14
(52) U.S. Cl. .......................................... 296/70; 180/90
(58) Field of Search ..................... 296/70, 24.1; 180/70

(56) References Cited

U.S. PATENT DOCUMENTS

| | | | | |
|---|---|---|---|---|
| 5,005,898 A | * | 4/1991 | Benedetto et al. | 296/70 |
| 5,088,571 A | * | 2/1992 | Burry et al. | 296/70 |
| 5,324,203 A | * | 6/1994 | Sano et al. | 296/70 |
| 5,685,595 A | * | 11/1997 | Nishijima et al. | 296/70 |
| 5,709,358 A | | 1/1998 | Kubota | |
| 5,857,726 A | * | 1/1999 | Yokoyama et al. | 296/70 |
| 5,979,965 A | | 11/1999 | Nishijima et al. | |
| 6,048,020 A | * | 4/2000 | Gronowicz et al. | 296/70 |
| 6,234,569 B1 | * | 5/2001 | Derleth et al. | 296/70 |
| 6,250,706 B1 | * | 6/2001 | Davis, Jr. et al. | 296/70 |
| 6,273,495 B1 | * | 8/2001 | Haba et al. | 296/70 |
| 6,276,739 B1 | * | 8/2001 | Wich | 296/70 |
| 6,296,303 B1 | * | 10/2001 | Kamiya et al. | 296/70 |
| 6,305,733 B1 | * | 10/2001 | Rahmstorf et al. | 296/70 |
| 6,322,122 B2 | * | 11/2001 | Burns et al. | 296/70 |
| 6,474,716 B2 | * | 11/2002 | Shikata et al. | 296/70 |

FOREIGN PATENT DOCUMENTS

| | | |
|---|---|---|
| DE | 198 23 602 A1 | 12/1999 |
| FR | 2 772 682 A1 | 6/1999 |
| JP | 408318761 A * | 12/1996 |
| WO | WO 98/49024 | 11/1998 |

* cited by examiner

*Primary Examiner*—Stephen T. Gordon
*Assistant Examiner*—Jason Morrow
(74) *Attorney, Agent, or Firm*—Harness, Dickey & Pierce, PLC

(57) ABSTRACT

To simplify the assembling of a vehicular cockpit module assembly, an instrument panel and its peripheral devices are divided into a plurality of sub module assemblies each of which having a corresponding main device. Each of the assemblies is assembled as a unit, and then the assemblies are mutually assembled. The assembling of each sub module assembly is completed to form a unit in advance.

12 Claims, 16 Drawing Sheets

VEHICULAR COCKPIT MODULE ASSEMBLY AND ASSEMBLING METHOD

CROSS-REFERENCE TO RELATED APPLICATION

The present invention is related to Japanese patent application No. 2000-151958, filed May 23, 2000; the contents of which are incorporated herein by reference.

1. Field of the Invention

The present invention generally relates to a cockpit module assembly, and more particularly, to a cockpit module assembly which incorporates an assembly of peripheral devices into the vehicle instrument panel.

2. Description of Related Art

Recently, there has been a demand for a formed module in which a vehicle instrument panel and devices around the instrument panel are integrally assembled as a cockpit module assembly. Such an assembly is mounted in a collective manner to a vehicle at one time, thus simplifying vehicle assembly. However, the conventional cockpit module assembly merely aggregates devices and parts which are originally disposed in the inside portion of the vehicle instrument panel and hence, the number of parts becomes extremely large (exceeding 400 parts as a specific example) so that the man-hour for assembling also becomes large. This simply means that, in the conventional cockpit module assembly, arrangement of peripheral devices in the instrument panel was performed by the vehicle manufacturer. Now, such arrangement is performed by the module manufacturer. This merely displaces the work load to the module manufacturer.

SUMMARY OF THE INVENTION

In view of these and other drawbacks, the present invention simplifies the assembly of a vehicular cockpit module assembly. Further, the present invention provides a vehicular cockpit module assembly that easily copes with variations in peripheral devices for the instrument panel.

According to a first aspect of the present invention, a vehicular cockpit module assembly is provided in which an instrument panel and peripheral devices are divided into a plurality of sub module assemblies corresponding to respective main devices, such that each sub module assembly includes the corresponding main device. Each of the plurality of sub module assemblies is assembled as a unit. Thereafter, the plurality of sub module assemblies are mutually assembled. By completing this assembly for each sub module assembly in advance, the man-hours for assembling the whole cockpit module assembly is decreased.

Further, since development and design is performed for every one of a plurality of sub module assemblies that include main devices, it is easier to make each sub module assembly perform the integration of function as a unit individually. As a result, the miniaturization and weight reduction of each sub module assembly as well as the easing of the assembling of each sub module assembly as a unit is facilitated.

According to a second aspect of the present invention, a vehicular cockpit module assembly is provided in which an instrument panel and peripheral devices are divided into a plurality of sub module assemblies corresponding to respective main devices, such that each sub module assembly includes the corresponding main device. At least one of the sub module assemblies completes an electric connection inside thereof and arranges connecting portions which perform connections with external wiring at a given portion in a collective manner.

By completing the electric connection in the sub module assembly unit in advance and arranging the connecting portions with the external wiring in a collective manner, even when the cockpit module assembly, as a whole, is provided with a large number of electric parts, the electric connection operation is simply completed.

In another aspect, the instrument panel and peripheral devices are divided into a plurality of sub module assemblies corresponding to respective main devices such that each sub module assembly includes the corresponding main device. At least one of the sub module assemblies comprises a standard portion which includes a standard assembly portion for assembling the sub module assemblies, a standard electric circuit portion and connecting portions with external wiring and a variation portion which is separate from the standard portion and is assembled to the standard portion. During cockpit module assembly, the standard portion can be efficiently assembled always with common parts in the same manner. Further, the variation portion is separate from the standard portion and can be assembled separately from the standard portion and hence, the cockpit module assembly can be easily assembled corresponding to variations which are changed with every vehicle type.

In another aspect, a plurality of sub module assemblies include a plurality of sub module assemblies having design portions as viewed from a cabin and one sub module assembly which constitutes a weight support structural body for supporting the weight of a plurality of sub module assemblies having design portions. The one sub module assembly which constitutes the weight support structural body supports the other sub module assemblies which have the design portions.

In another aspect, the one sub module assembly which constitutes the weight support structural body includes at least one of an air-conditioning indoor unit portion, a reinforcing member for supporting a steering device, and an air-conditioning duct portion.

In another aspect, the one sub module assembly which constitutes the weight supporting structural body is provided with an integrated electric wiring bundle which is formed by integrating a large number of bundled electric wires and electric distribution portions of the integrated electric wiring bundle.

Here, the one sub module assembly which constitutes the weight supporting structural body is provided with the integrated electric wiring bundle and the electric distribution portions as the standard portion. The integrated electric wiring bundle and the electric distribution portions can be constructed to be commonly used by other sub module assemblies (formed as relay stations of communication lines), simplifying the cockpit module assembly.

According to a seventh aspect of the present invention, a plurality of sub module assemblies are comprised of 1) an air-conditioning sub module assembly which includes air-conditioning indoor unit portions, a reinforcing member for supporting a steering device and an integrated electric wiring bundle formed by integrating a large number of electric wiring in a bundle and constitutes a weight supporting structural body, 2) an instrument panel design sub module assembly including an instrument panel, 3) a meter sub module assembly including meters for indicating the drive condition of vehicle, 4) a center cluster sub module assembly arranged at approximately a central portion in the lateral direction of the instrument panel and integrating a plurality of devices such as an audio device, a navigation device and the like therein, and 5) a steering sub module assembly including a steering device.

According to an eighth aspect of the present invention, in an assembling method of a vehicle cockpit module assembly which assembles an instrument panel and its peripheral devices as an assembly, the method includes a sub assembling step in which the instrument panel and the peripheral devices are divided into a plurality of sub module assemblies corresponding to respective main devices such that each sub module assembly includes the corresponding main device and each one of a plurality of sub module assemblies is assembled as a unit, and a whole assembling step which is performed thereafter and makes a plurality of sub module assemblies mutually assembled.

Due to such a method, the enhancement of the reduction of the number of man-hours, the miniaturizing and reduction of weight of the sub module assemblies and the facilitating of the assembling of the sub module assemblies can be achieved for each sub module assembly unit as in the case of the first aspect of the present invention.

According to a ninth aspect of the present invention, at least one of a plurality of sub module assemblies comprises a standard portion which includes a standard assembly portion for performing the mutual assembling among sub module assemblies, a standard electric circuit portion, a connecting portion which connects the standard electric circuit portion with external wiring, and a variation portion which is separate from the standard portion and is assembled to the standard portion, wherein only the assembling of the standard portion is performed in the sub assembling step and the variation portion is assembled to the standard portion before or in the midst of the entire assembling step.

Due to such a construction, as in the case of the third aspect of the present invention, the cockpit module assembly can be easily assembled corresponding to variations which are different for every vehicle type.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DESCRIPTION

Embodiments of the present invention are explained hereinafter in conjunction with attached drawings.

First Embodiment

Figure 1:
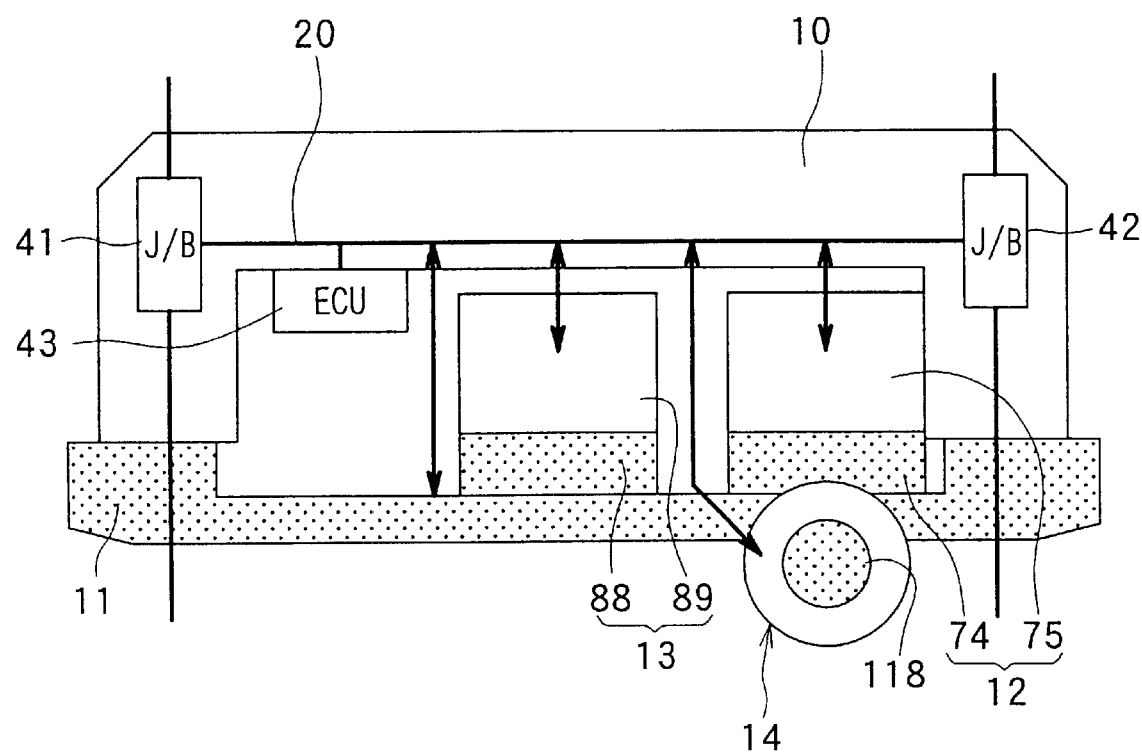
FIG. 1 is a schematic view of a cockpit module assembly according to a first embodiment of the present invention.

FIG. 1 is a view showing a concept of a cockpit module assembly according to a first embodiment. In the drawing, an instrument panel 15 (see FIG. 5) and devices arranged in the periphery of the instrument 15 are divided into five sub module assemblies 10–14 corresponding to main devices such that each sub module assembly includes a corresponding main device. These five sub module assemblies 10–14 are respectively assembled as single units. Thereafter, these five sub module assemblies 10–14 are mutually assembled.

These five sub module assemblies include an air-conditioning sub module assembly ("air-conditioning sub module") 10, an instrument panel design sub module assembly 11 including an instrument panel 15 ("instrument panel design sub module"), a meter sub module assembly 12 including meters for indicating the drive condition of vehicle ("meter sub module") 12, a center cluster sub module assembly ("center cluster sub module") 13 and a steering sub module assembly ("steering sub module") 14. In FIG. 1, a dotted portion indicates the variation portion (design portion).

The term "cockpit module assembly" includes not only a cockpit module assembly in a state where respective sub module assemblies 10–14 are formed into a mechanically integral structure by combining them with each other, but it also includes a cockpit module assembly in a state where the mutually assembled state among respective sub module assemblies 10–14 is maintained by a suitable jig and is mounted on a vehicle.

Figure 2:
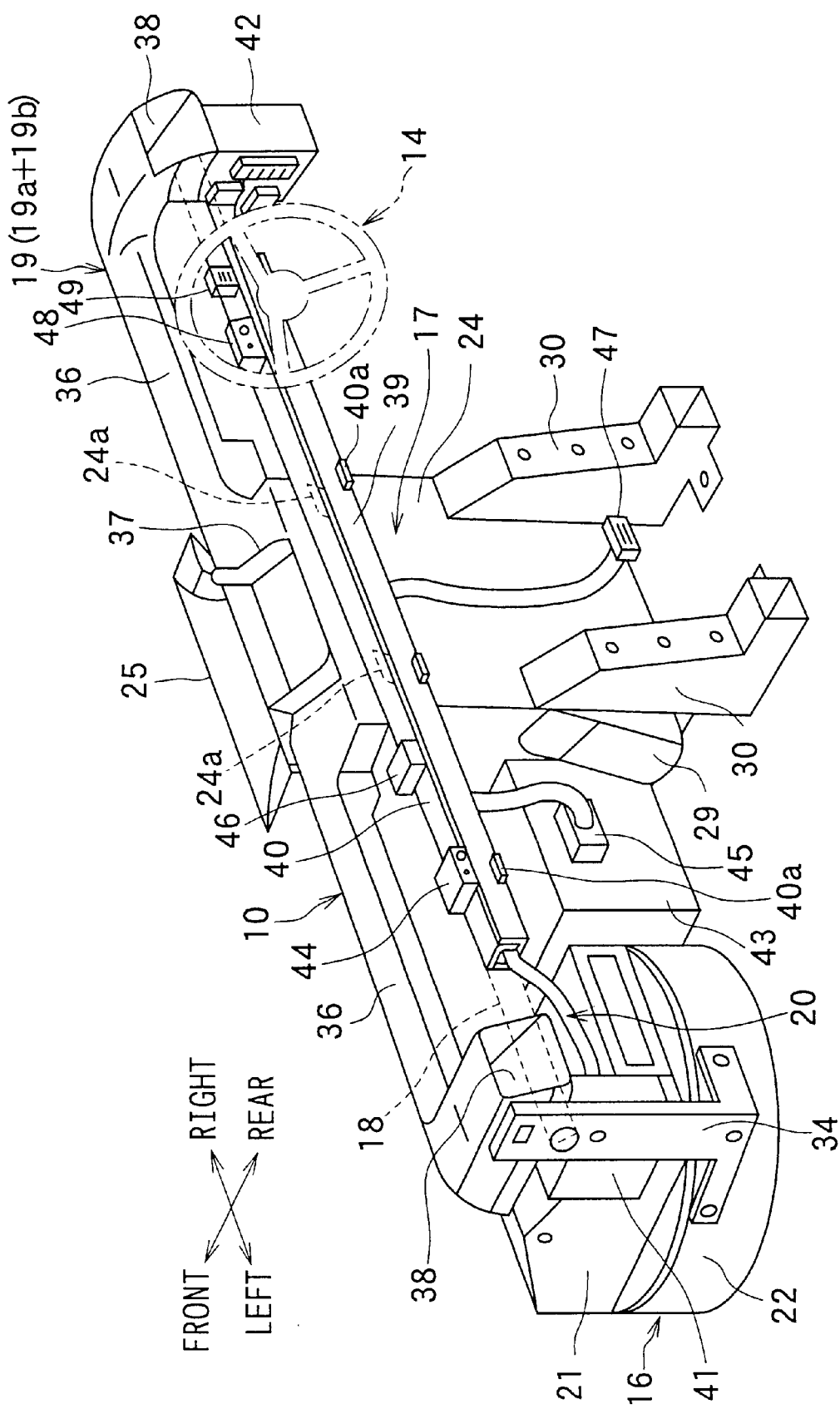
FIG. 2 is a perspective view of an air-conditioning sub module according to the present invention.
Figure 3:
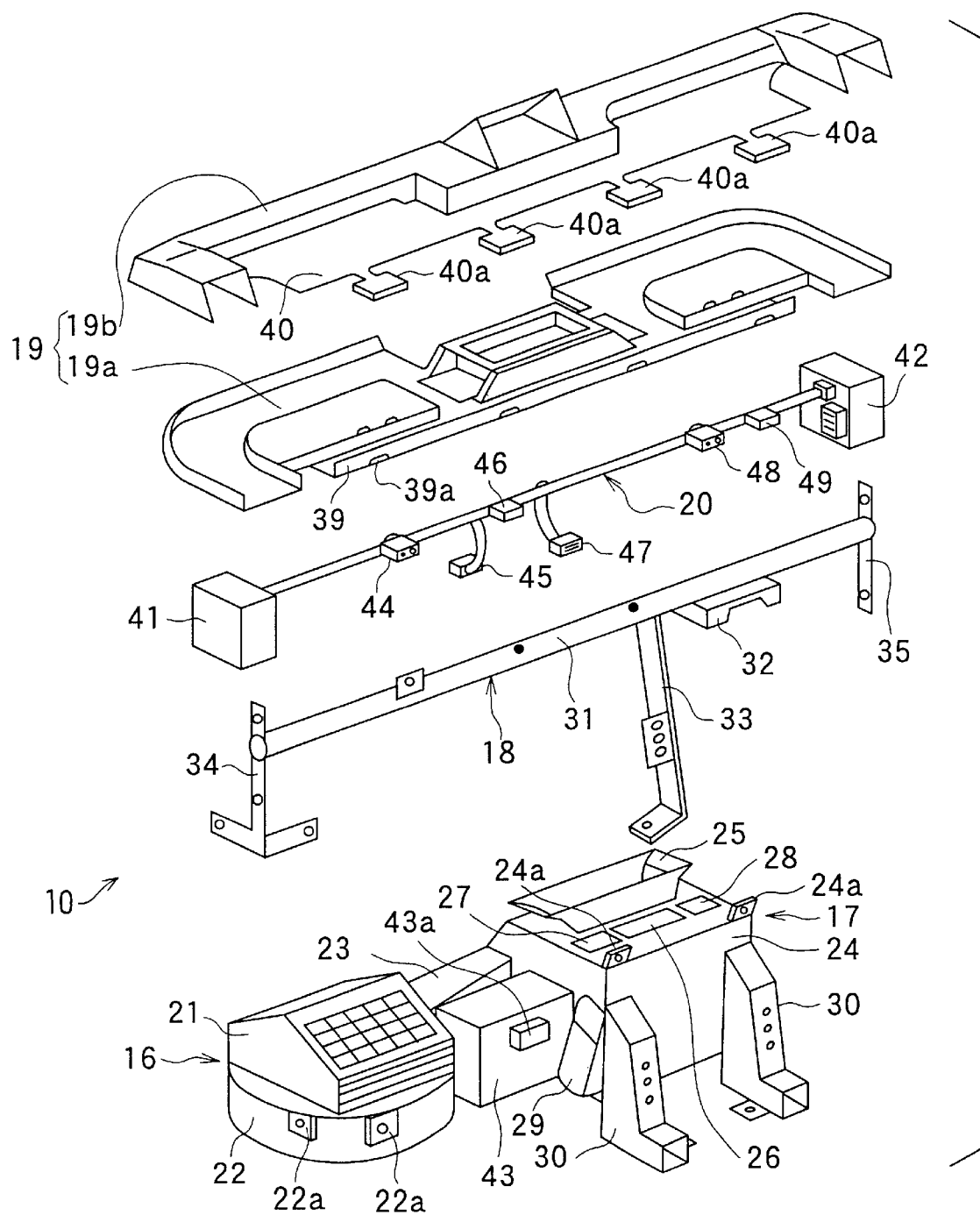
FIG. 3 is an exploded perspective view of an air-conditioning sub module according to the invention.

(1) To explain the air-conditioning sub module 10 in conjunction with FIGS. 2 and 3, in the cockpit module assembly, the air-conditioning sub module 10 constitutes a weight supporting structural body for supporting other sub modules 11–14. The skeletal portion of the cockpit module assembly simultaneously plays a role as a relay station of a communication line.

FIG. 2 shows the air-conditioning sub module 10 assembled and FIG. 3 shows the air-conditioning sub module 10 disassembled. The air-conditioning sub module 10 is constructed with an air-conditioning portion (a blower unit 16 and an air-conditioning indoor unit 17), a reinforcing member 18 for supporting the steering sub module 14, an air-conditioning duct portion 19, and an integrated electric wiring bundle 20 which is formed of a single bundle made of a large number of electric wires.

Since this embodiment illustrates where right hand steering is used, the blower unit 16 of the air-conditioning sub module 10 is arranged on an assistant seat side disposed at the left side of a vehicle. The air-conditioning unit 17 is arranged approximately central in the lateral direction (left and right direction) of the vehicle. In the drawing, arrows shown in FIG. 2 indicate the back-and-forth direction and the left-and-right direction in the state that the air-conditioning sub module 6 is mounted on the vehicle.

Since the blower unit 16 and the air-conditioning unit 17 have well-known constructions, their outline is briefly explained. That is, an inside-outside changeover switch 21 is arranged in an upper portion of the blower unit 16. And, a centrifugal blower 22 is arranged at a lower portion of the blower unit 16, whereby air (inside or outside air) introduced by the changeover of an inside-outside changeover door disposed in the inside of the inside-outside changeover box 21 is blown by the centrifugal blower 22.

The blower 22 has a centrifugal blower fan thereof not shown in the drawing that is driven by a motor. The air blown from the blower 22 flows in the inside of a case 24 of the air-conditioning unit 17 through a blow-out duct portion 23 (FIG. 3). The air-conditioning unit 17 adjusts the temperature of the blow-out air supplied from the blower unit 16, and blows air into the cabin. As is known, inside case 24, an evaporator for cooling the blow-out air (heat exchanger for cooling), a hot-water type heater core for heating the blow-out air (heat exchanger for heating), an air mixing door (temperature control means), and a blow-out mode door which constitutes a blow-out mode changeover mechanism and the like are incorporated.

As shown in FIG. 3, a defroster opening portion 25 is formed in a front portion of an upper surface of a case 24 of the air conditioning unit 17. A center face opening portion 26 is formed central in a rear portion of the upper surface of the case 24. Further, side-face opening portions 27, 28 are respectively formed in left and right sides of the case 24. On side surface portions at both left and right sides of the case 24, foot blow-out ducts 29 for the front seat are integrally formed. Further, on a surface of the vehicle rear side of the case 24, foot blow-out ducts 30 for the rear seat are integrally formed for left and right side portions thereof.

The reinforcing member 18 extends laterally in the vehicle, above the blower unit 16 and the air-conditioning unit 17 in the inside of the instrument panel 15. Here, a body portion 31 of the reinforcing member 18 is made of a bar-like member (reinforcing member) as shown in FIG. 3, wherein "bar-like" includes a pipe shape having a hollow portion. Further, the pipe shape is not limited to circular cross section and may be a rectangular cross section or the like. The bar-like body portion 31 is made of metal (iron-based metal or the like).

The reinforcing member 18 is mainly provided for supporting and fixedly securing a steering sub module 14 which will be explained later. Since the vehicle used here is a right-handed vehicle, a support stay (support portion) 32 of the steering sub module 14 is provided to a portion offset to the right from a central portion of the bar-like body portion 31.

Further, the bar-like body portion 31 is provided with a metal-made reinforcing support stay 33 at a portion disposed at the left-side of the support stay 32. The reinforcing support stay 33 is disposed along a driver-seat side face (right-side face) of the air-conditioning unit 17 and has a lower end thereof fixedly secured to a floor surface portion of a chassis.

On both end portions in the lateral direction of the vehicle of the bar-like body portion 31, side brackets 34, 35 which constitute separate members from the reinforcing member 18 are fixedly mounted. The side brackets 34, 35 are made of metal (iron-based metal or the like) and are formed into a plate shape. In this embodiment, the side brackets 34, 35 are fixedly secured by fastening to left and right side face portions of the vehicle by fastening means such as screw means through mounting holes formed in the side brackets 34, 35.

Since the stays 32, 33 and the side brackets 34, 35 constitute variation portions which can be changed corresponding to vehicle type, they can be removed and mounted on the bar-like portion 31 of the reinforcing member 18 using screw means or the like. A mounting portion 22a for mounting the blower unit 16 on the left-side side bracket 34 is provided to a blower 22 portion disposed at a lower portion of the blower unit 16 and the blower unit 16 is assembled with this mounting portion 22a using screws or the like. Further, mounting portions 24a are provided at two portions disposed at a rear-side upper portion of the case 24. The air-conditioning unit 17 is assembled to an intermediate portion of the bar-like portion 31 at the mounting portion 24a using fastening means such as screws.

The air-conditioning duct portion 19 allows blow-out air (air after temperature adjustment) fed from the air-conditioning unit 17 to flow therethrough and is disposed above the blower unit 16 and the air-conditioning unit 17. It is at a front side of the reinforcing member 18, inside of the instrument panel 15, such that air-conditioning duct portion 19 extends laterally in the vehicle.

Figure 9:
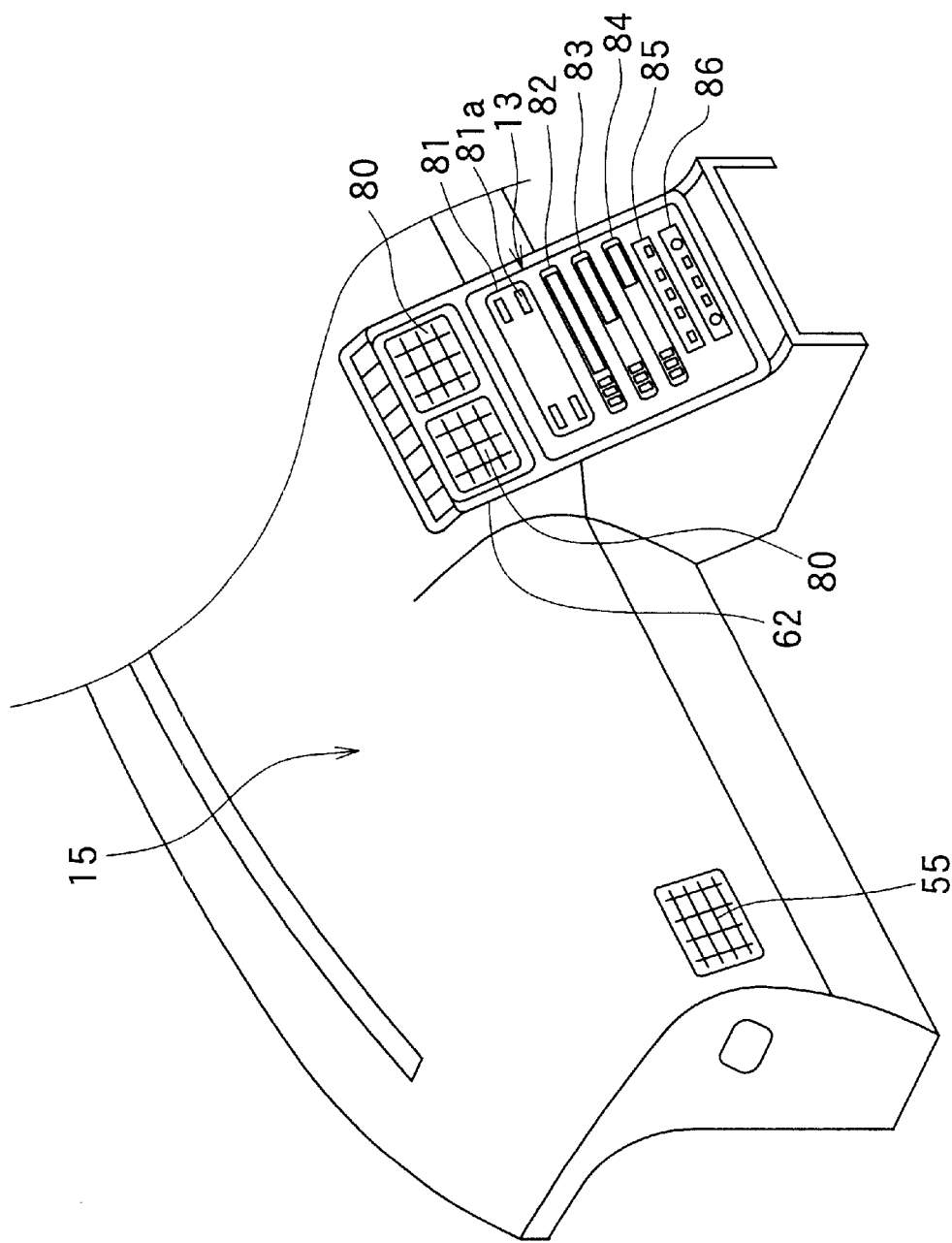
FIG. 9 is a partial perspective view of an instrument panel showing a center cluster sub module of the first embodiment.

In FIG. 3, the air-conditioning duct portion 19 includes a resin-made duct base plate 19a having a given shape which constitutes a lower half portion of an air passage and a duct cover 19b of a given shape constituting an upper half portion of the air passage. The duct base plate 19a constitutes a rigid portion having a given rigidity. On the other hand, the duct cover 19b is made of flexible material (foamed resin material or the like) which is easily deformable. The air-conditioning duct portion 19 is constructed by hermetically integrating the duct base plate 19a and the duct cover 19b using securing means such as adhesion or welding. Further, a center face duct connecting portion 37 positioned between left and right side face duct portions 36, is integrally formed on the air-conditioning duct portion 19 in this embodiment. The center face duct connecting portion 37 communicates with the center face opening portion 26 of the case 24 and a center face blow-out grill 80 (FIG. 9).

The left and right side face duct portions 36 communicate with the left and right side face opening portions 27, 28.

Further, these side face duct portions 36 extend in left and right directions from these communicating portions and respectively form side face blow-out openings 38 at distal end portions at left and right sides. A defroster opening portion 25 of the previously-mentioned case 24 communicates with a defroster blow-out duct portion 59 (FIG. 5) which will be explained later.

Further, since the air-conditioning duct portion 19 is disposed on and adjacent to the reinforcing member 18, by fixedly securing the duct base plate 19a (the rigid portion) to an intermediate portion and left and right side brackets 34, 35 of the bar-like body portion 31 of the reinforcing member 18 by means of fastening means such as screw means, the air conditioning duct portion 19 can be fixedly secured to the reinforcing member 18.

Subsequently, the integrated electric wiring bundle 20 is formed by integrating a large number of trunk electric wires disposed inside the instrument panel 15, in one bundle, and has an outer periphery thereof protected by an insulation coating material such as resin or the like. Here, the trunk electric wiring are wiring which is commonly used for electrical signal communication or electricity supply among a plurality of devices inside and outside of the instrument panel 15.

A wiring holding portion 39 extends linearly along the lateral direction of vehicle and is formed by an integral molding on the duct base plate 19a which constitutes the lower half portion of the air-conditioning duct portion 19. This wiring holding portion 39 is formed into a trough-like cross-sectional shape which protrudes downwardly. Further, a wiring securing portion 40 is formed by an integral molding on a rear-side end portion of the duct cover 19b.

After accommodating the integrated electric wiring bundle 20 in the wiring holding portion 39 of the duct base plate 19a, an upper-side surface of the integrated electric wiring bundle 20 is pressed to the wiring securing portion 40 of the duct cover 19b. And, engaging lugs 40a disposed at a plurality of portions along the wiring fixing portion 40 are inserted into and engaged with hole portions 39a formed in the wiring holding portion 39, wiring securing portion 40, integral with the duct cover 19b, allows integrated electric wiring bundle 20 to be held and secured onto the wiring holding portion 39 of the duct base portion 19a.

Further, electric distribution boxes (junction boxes) 41, 42 which respectively perform the electric distribution of the integrated electric wiring bundle 20 are electrically connected to both left and right end portions of the integrated electric wiring bundle 20. These electric distribution boxes 41, 42, disposed at both left and right ends of the integrated electric wiring bundle 20, distribute electric signals and electricity or the like between an electric circuit portion in an engine room and an electric circuit portion in the cabin, between the instrument panel 15 electric circuit portion and the chassis side in the cabin, and between the instrument panel 15 electric circuit portion and a rear seat side of the cabin and the like.

Accordingly, wiring for the above-mentioned electric distribution are provided inside of resin-made box bodies of the electric distribution boxes 41, 42 and connectors for connection with external wiring are disposed on outer surfaces of the resin made box bodies of the electric distribution boxes 41, 42.

In this embodiment, upper end portions of electric distribution boxes 41, 42 are fixedly secured to left and right end portions of the duct base plate 19a by fastening means such as screws or the like (not shown in the drawing). Devices such as electronic controlling units made of microcomputers or the like, relays, fuse boxes and the like may be built inside the electric distribution boxes 41, 42.

The air-conditioning electronic controlling unit 43 is includes a microcomputer or the like and is disposed between the blower unit 16 and the air-conditioning unit 17 at a side position behind the blow-out duct portion 23. The air-conditioning electronic controlling unit 43 may include an integrated electronic controlling unit which controls other functions besides the air-conditioning function. Further, a plurality (six in this embodiment) of connectors 44–49 are connected to the intermediate portion in the lateral direction of the integrated electric wiring bundle 20. Among a plurality of these connectors 44–49, as shown in FIG. 1, the connector 45 electrically connects with the air-conditioning electronic controlling unit 43.

Figure 4:
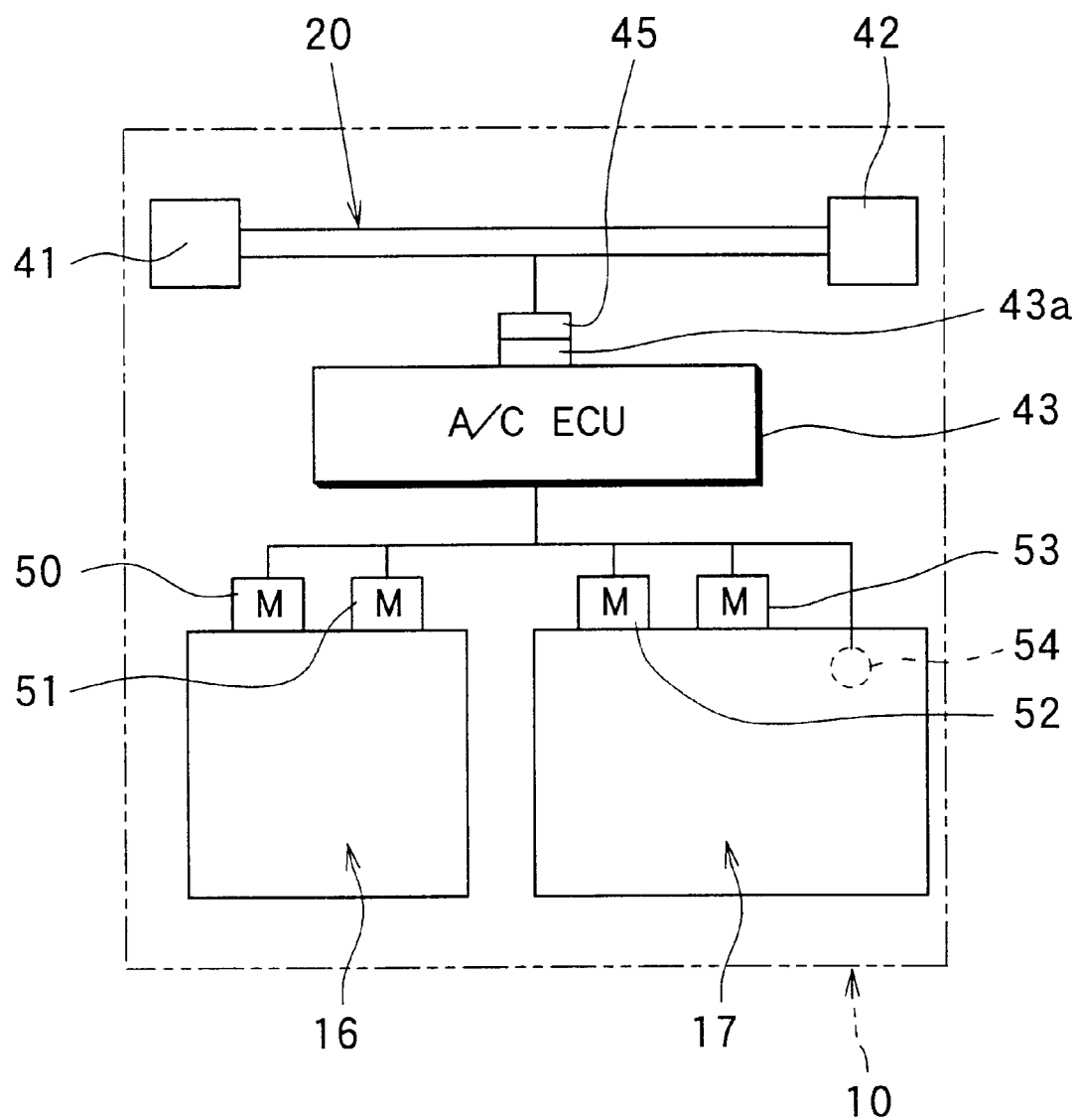
FIG. 4 is an electrical block diagram of an air-conditioning sub module according to the invention.

Here, to explain the electric connection in the inside of the air-conditioning sub module 10, FIG. 4 illustrates a schematic of the electric wiring of the air-conditioning sub module 10, wherein the blower unit 16 includes electric devices such as an inside air/outside air changeover motor 50, a blower motor 51 and the like. Further, the air-conditioning unit 17 includes electric devices such as an air mixing door motor 52, a blow-out mode door motor 53, an evaporator temperature sensor 54 and the like. All of these electric devices are electrically connected to the air-conditioning electronic controlling unit 43 during assembly of the air-conditioning sub module 10. Further, by connecting the connector 45 of the integrated electric wiring bundle 20 to a connector 43a of air-conditioning electronic controlling unit 43, during assembly of the air-conditioning sub module 10, electric connection inside the air-conditioning sub module 10 is completed. Here, the connecting portions between the integrated electric wiring bundle 20 and the wiring outside the cockpit module assembly are arranged in the electric distribution boxes 41, 42 in a collective manner.

Further, an entire group of sensors such as an outside air temperature sensor, an inside air temperature sensor, an insolation sensor, an engine water temperature sensor and the like, and a group of manipulation switches on an air-conditioning panel 86 (FIG. 9) provided to the center cluster sub module 13, and electric devices such as a compressor electromagnetic clutch and a cooling fan motor for a condenser and the like mounted in a vehicle engine are electrically connected to the air-conditioning electronic controlling unit 43 by integrated electric wiring bundle 20 through the connecting portions of the above-mentioned connectors 43a, 45.

Here, in the above-mentioned air-conditioning sub module 10, the blower unit 16, the air-conditioning unit 17, the duct base plate 19a of the air-conditioning duct portion 19 and the reinforcing member 18 act as a weight supporting structural body having high rigidity. Accordingly, the air-conditioning sub module 10 constitutes a standard portion (core portion) which becomes the weight supporting structural body in the whole cockpit module assembly. Here, in the reinforcing member 18, the stays 32, 33 and the side brackets 34, 35 constitute the variation portion which can be changed to a vehicle type.

Figure 5:
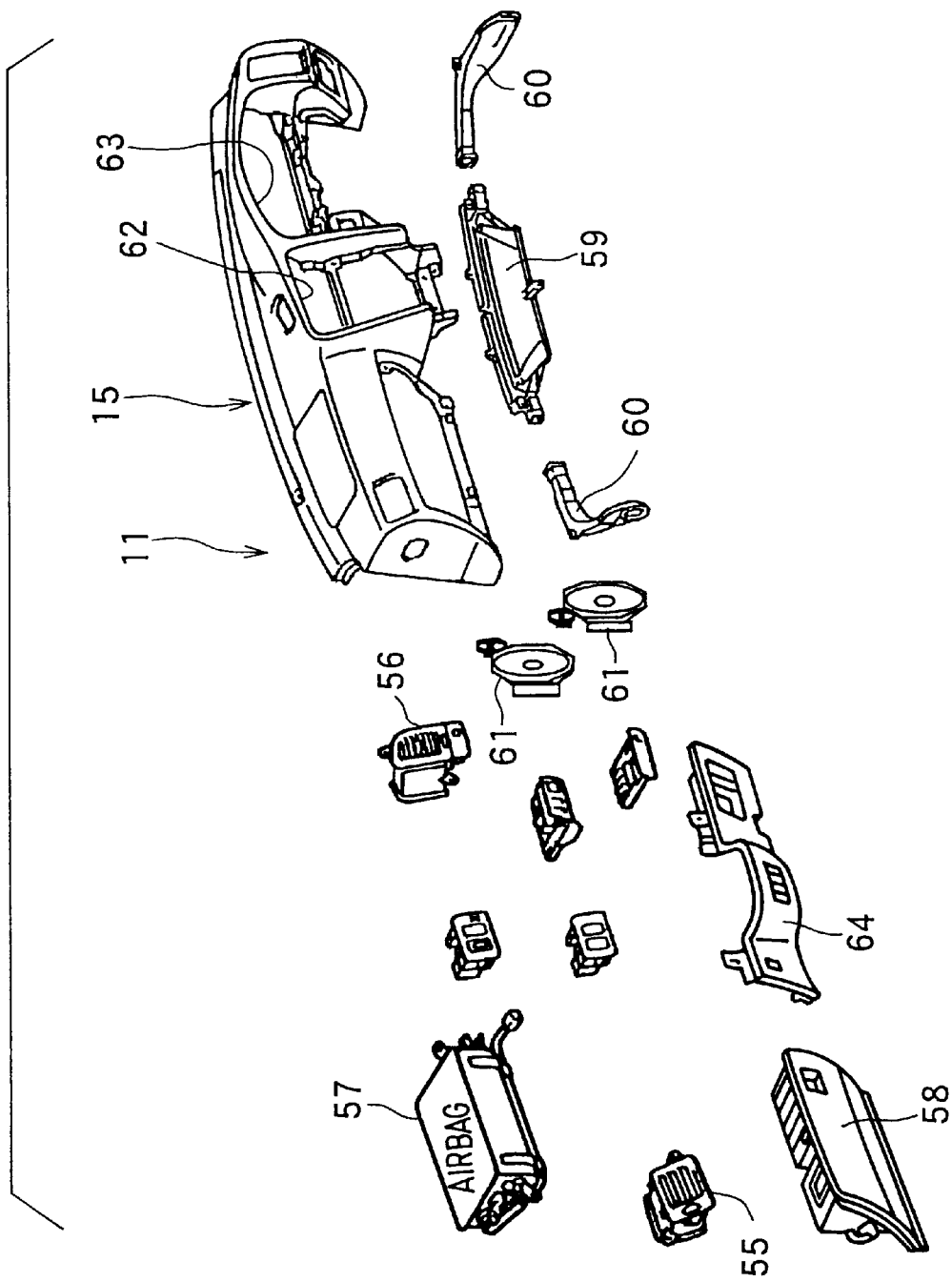
FIG. 5 is an exploded perspective view of an instrument panel design sub module of the first embodiment according to the invention.

(2) In FIG. 5, the instrument panel 15 is a resin-formed body having a width extending the entire lateral length in the cabin. At both left and right end portions of the instrument panel 15, side face grill mechanisms 55, 56 mounted in the side face blow-out openings 38, 38 of the air-conditioning sub module 10 are disposed. Further, an assistant seat air bag device 57 and a glove box 58 are disposed at the assistant seat side of the instrument panel 15.

Further, central in the lateral direction of the instrument panel 15, a defroster blow-out duct portion 59 connects to the defroster opening portion 25 of the air-conditioning sub module 10. Side defroster blow-out duct portions 60, 60 connect to both left and right sides of the defroster blow-out duct portion 59. Besides the above-mentioned construction, inside the instrument panel 15, various devices such as audio speakers 61 and the like are disposed.

A mounting portion 62 of the center cluster sub module 13 is provided to a portion of the instrument panel 15 disposed at the vehicle rear side of the central portion in the lateral direction. Further, a mounting portion 63 of the meter sub module 12 is provided on a portion of the instrument panel 15 at the driver seat side. A cover 64 covers a lower portion of the mounting portion 63.

Figure 6:
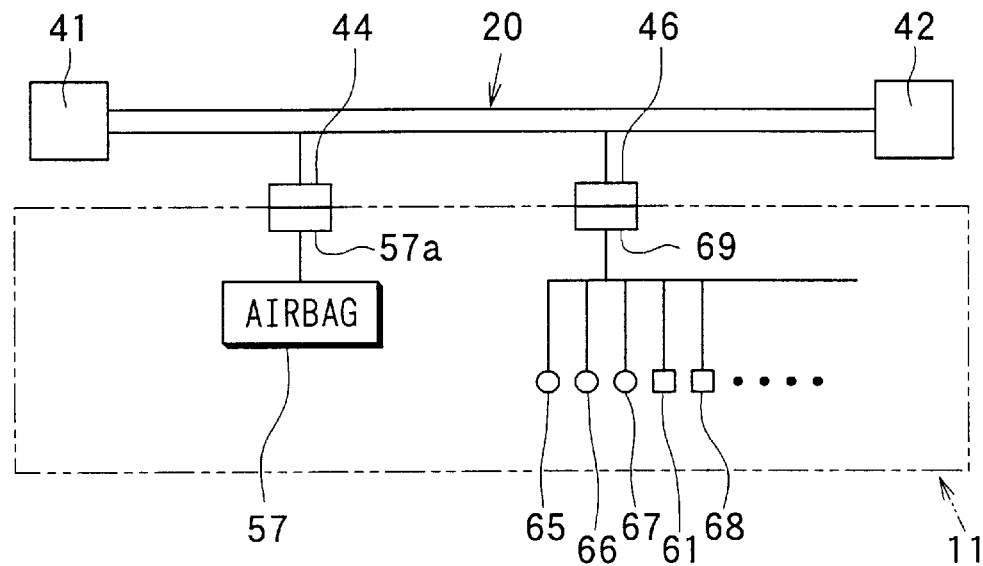
FIG. 6 is an electric connection block diagram of the instrument panel design sub module according to the first embodiment of the invention.

FIG. 6 is an electric wiring schematic in the instrument panel design sub module 11, wherein a dedicated connector 57a is provided to the assistant seat air bag device 57. Further, connecting portions of other various electric devices mounted on the instrument panel design sub module 11 such as, for example, the air-conditioning insolation sensor 65, the air-conditioning inside air temperature sensor 66, an illumination automatic flickering (light controlling) sensor 67, the above-mentioned speaker 61, an illumination circuit portion 68 of the grove box 58 are formed in an collective manner to provide a common unitary connector 69.

The electric connection shown in FIG. 6 is designed to be completed during assembly of the instrument panel design sub module 11. When the air-conditioning sub module 10 is assembled to the instrument panel design sub module 11, the connector 57a is connected to the connector 44 of the integrated electric wiring bundle 20 of the air-conditioning sub module 10, while the above-mentioned unitary connector 69 is connected to the connector 46 of the integrated electric wiring bundle 20. Since the instrument panel 15 design is changed for every vehicle type, that is, the instrument panel 15 constitutes the variation portion, the whole instrument panel design sub module 11 made of the instrument panel 15 and peripheral parts thereof constitutes the variation portion.

Although FIG. 6, shows connector 57a used exclusively for the assistant seat air bag device 57 to ensure the quality of the assistant seat air bag device 57, the connecting portion of the assistant seat air bag device 57 may be formed into the common unitary connector 69 in an collective manner.

(3) Subsequently, the meter sub module 12 is explained in conjunction with FIG. 7 and FIG. 8. A meter panel 70 is a resin-made plate member mounted on the instrument panel 15. At a central recessed portion of the meter panel 70, indication meters 71 such as a tachometer, engine rotational speed, engine water temperature meter, fuel meter and the like are arranged. Further, various vehicle information indication portions 72 (FIG. 8) are arranged on the meter panel 70. A meter circuit board 73 having a printed circuit board shown in FIG. 8 is arranged on the rear surface side of the metal meter panel 70. And, rotary devices for driving indication meters, illumination light sources (light emitting diodes or the like), a liquid crystal display panel and the like which are not shown in the drawing are arranged on the meter circuit board 73.

The portions of the meter panel 70 and the meter circuit board 73 constitute a design portion where the design and the specification are changed with every vehicle type. That is, such portions constitute a variation portion 74. Further, a standard circuit portion (core portion) 75 is arranged on a rear surface side (vehicle front side) of the circuit board 73. This standard circuit portion 75 is commonly used irrespective of change of variation portion 74. FIG. 8 shows where any one of three kinds a, b, c is combined to one standard circuit portion 75 as the variation portion 74.

Here, the standard circuit portion 75 incorporates a control portion which controls the operation of the indication meters 71 and a vehicle information display portion 72 and a power source circuit portion for the power source therein. Further, the standard circuit portion 75 has a unitary connecting portion 75a where connection portions with external wiring are formed at a place in a collective manner on a vehicle front side surface. Further, the circuit board 73 and the standard circuit portion 75 are electrically connected by means of a flexible printed circuit board 76 having enough flexibility to allow deformation thereof. As such, electric connection inside the meter sub module 12 is completed. On the other hand, at a given position on a holding plate 77 (FIG. 7) provided on the instrument panel 15, the connector 48, branched from the integrated electric wiring bundle 20 of the air-conditioning sub module 10, is arranged so that the connector 48 is a standby connector.

Figure 7:
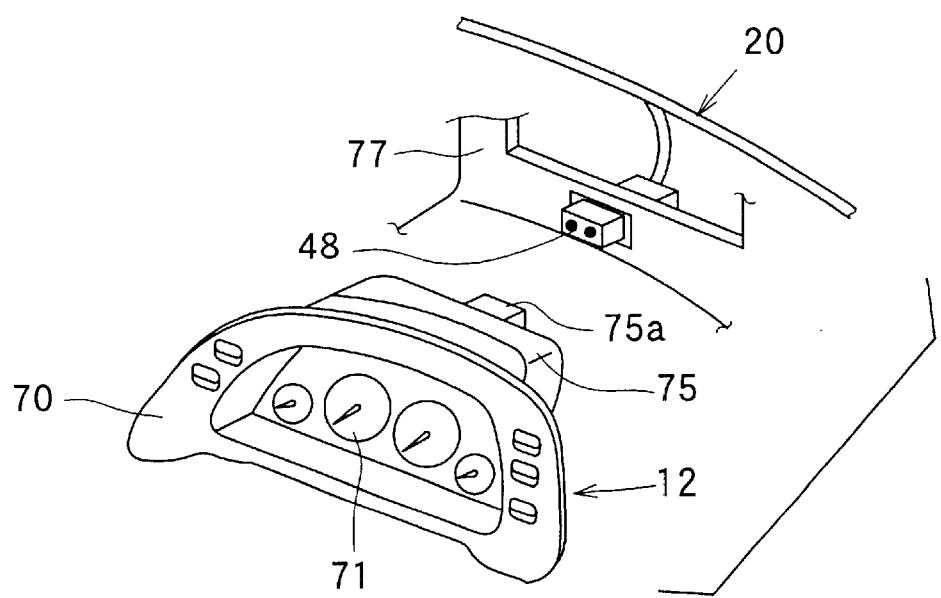
FIG. 7 is a perspective view of a meter sub module of the first embodiment of the invention.
Figure 8:
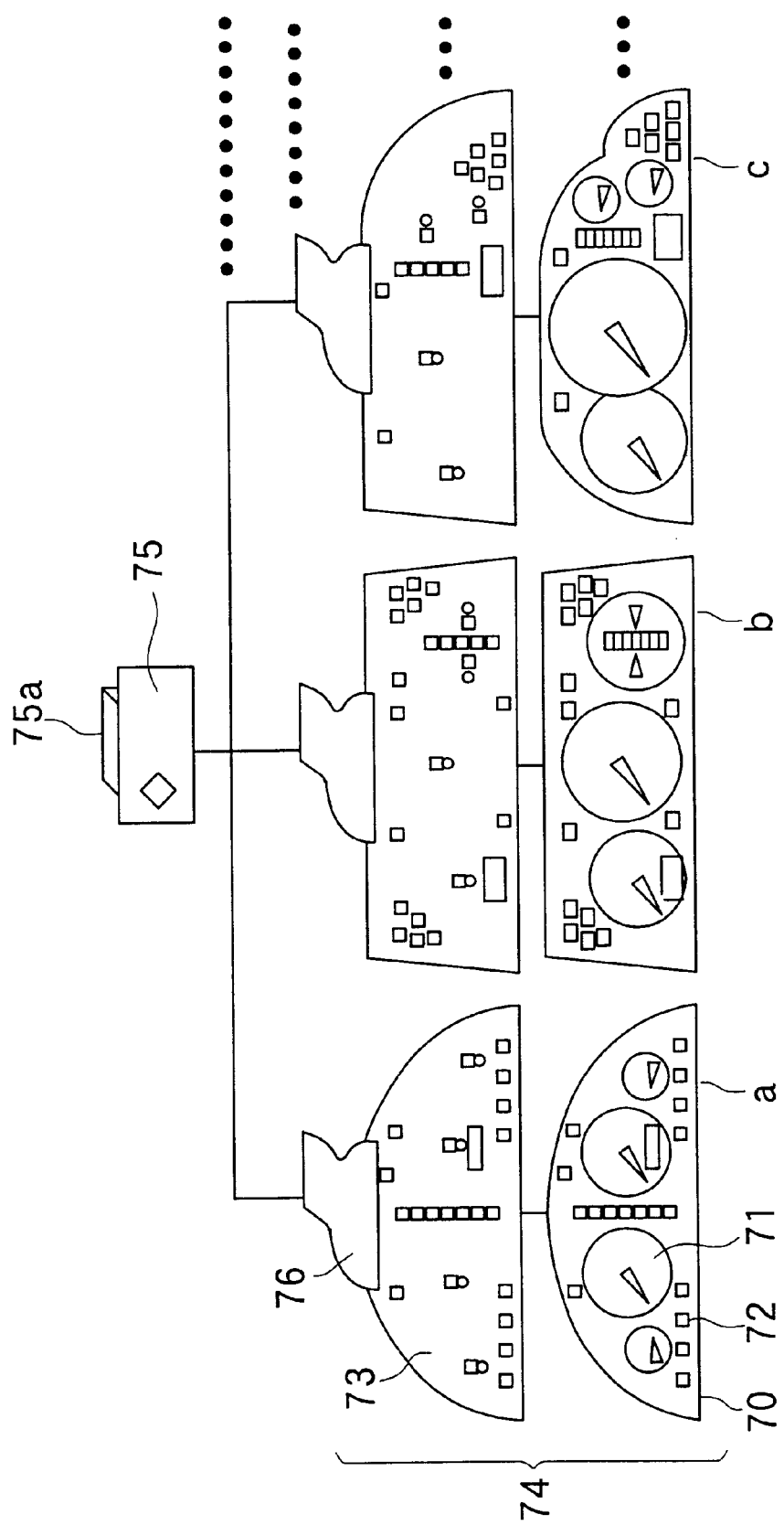
FIG. 8 is a schematic view of the meter sub module of the first embodiment of the invention.

Accordingly, as shown in FIG. 7, by pressing the meter sub module 12 to the holding plate 77 side (vehicle front side) after assembling the meter sub module 12 as a single assembly, the connector portion 75a provided to the vehicle front side surface of the standard circuit portion 75 is fit to the connector 48 such that the meter sub module 12 can be electrically connected to the integrated wiring bundle 20 of the air-conditioning sub module 10.

Figure 10:
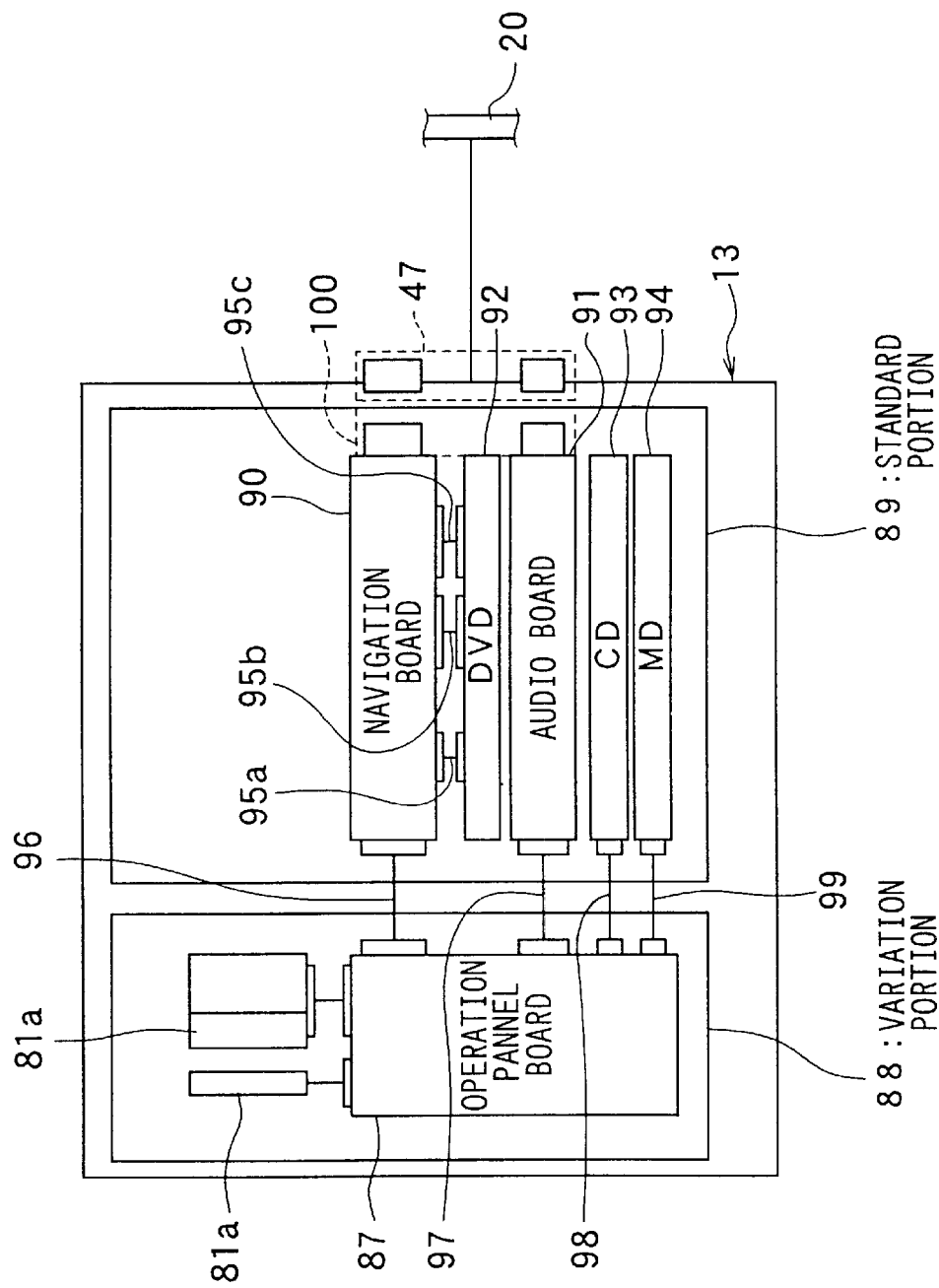
FIG. 10 is an electrical connection block diagram of a center cluster sub module of the first embodiment according to the invention.

(4) Subsequently, the center cluster sub module 13 is explained in conjunction with FIG. 9 and FIG. 10. The center cluster sub module 13 is an integral structure (combined body) formed by integrating a plurality of devices and is arranged on the mounting portion 62 of the instrument panel 15, central in the lateral direction. As shown in FIG. 9, the center cluster sub module 13 has an air-conditioning center face blow-out grill 80, a display screen portion 81 including a liquid crystal panel or the like, a DVD (Digital Video Disc) manipulation panel 82, a CD (Compact Disc) manipulation panel 83, an MD (Mini Disc) manipulation panel 84, a radio manipulation panel 85, an air-conditioning manipulation panel 86 and the like.

Further, the display screen portion 81 can change between various displays such as a navigation device, a television, the vehicle rear and the like, and includes a touch panel switch 81a which performs the manipulation of the display changeover operation.

In the center cluster sub module 13, at the rear side of the above-mentioned display screen portion 81 and the manipulation panels 82–86, a manipulation panel substrate 87 (FIG. 10) is positioned and electrically connected with these parts. The design portion of the center cluster sub module 13, that is, the variation portion 88 is constructed by the above-mentioned front-surface side devices 81–86 and the back-surface side manipulation panel substrate 87.

Further, a standard portion (core portion) 89 is provided that corresponds to this variation portion 88. This standard portion 89 includes a navigation integration circuit board 90 which constitutes an integration controlling unit (integration ECU) for controlling the navigation device, the television, a video, an automatic taxing system (ETC and the like), an audio integration circuit board 91 which constitutes an integration controlling unit (integration ECU) for performing the control of the audio device, a DVD deck 92 which reads image signals and speech signals such as map information from the DVD, a CD deck 93 which reads audio signals from the CD, an MD deck 94 which reads speech signals from the MD and the like.

The DVD deck 92 is electrically connected to the integrated circuit board 90 through connectors 95a, 95b, 95c. Further, both integrated circuit boards 90, 91 and respective decks 92–94 are electrically connected with the manipulation panel substrate board 87 through connectors 96, 97, 98, 99. Due to such a constitution, the audio signals of the CD deck 93 and the MD deck 94 are added to the audio integrated circuit board 91 through the manipulation panel substrate 87.

Further, the standard portion 89 is provided with a unitary connector 100 that extends over both of the above-mentioned integrated circuit boards 90, 91. A navigation terminal portion 100a and an audio terminal portion 100b are integrally provided to this unitary connector 100. The electric connections between respective parts of the variation portion 88 and the standard portion 89 are completed as shown in FIG. 10 at the time of assembling the center cluster sub module 13.

The unitary connector 100 is connected with the connector 47 branched from the integrated electric wiring bundle 20 of the air-conditioning sub module 10. Due to such a constitution, the input of vehicle operation signals and various antenna receiving signals and the supply of power and the like to the above-mentioned integrated circuit substrates 90, 91 are performed through the integrated electric wiring bundle 20.

(5) Subsequently, the steering sub module 14 is explained in conjunction with FIG. 11. In the embodiment shown in the drawing, a column type transmission lever 111 is disposed in a tilt steering column portion 110. The steering sub module 14 is further provided with other main parts such as a steering wheel 112, a horn switch portion 113, a lighting switch 114 which performs a flickering operation of a headlight or the like, a wiper switch 115 which performs the manipulation of a wiper device, a steering column upper cover 116, and a steering column lower cover 117. In such a steering sub module 14, the steering wheel 112 and the horn switch portion 113 constitute a design portion, that is, a variation portion 118. The other parts constitute a commonly used standard portion irrespective of the change of the variation portion 118.

Figure 11:
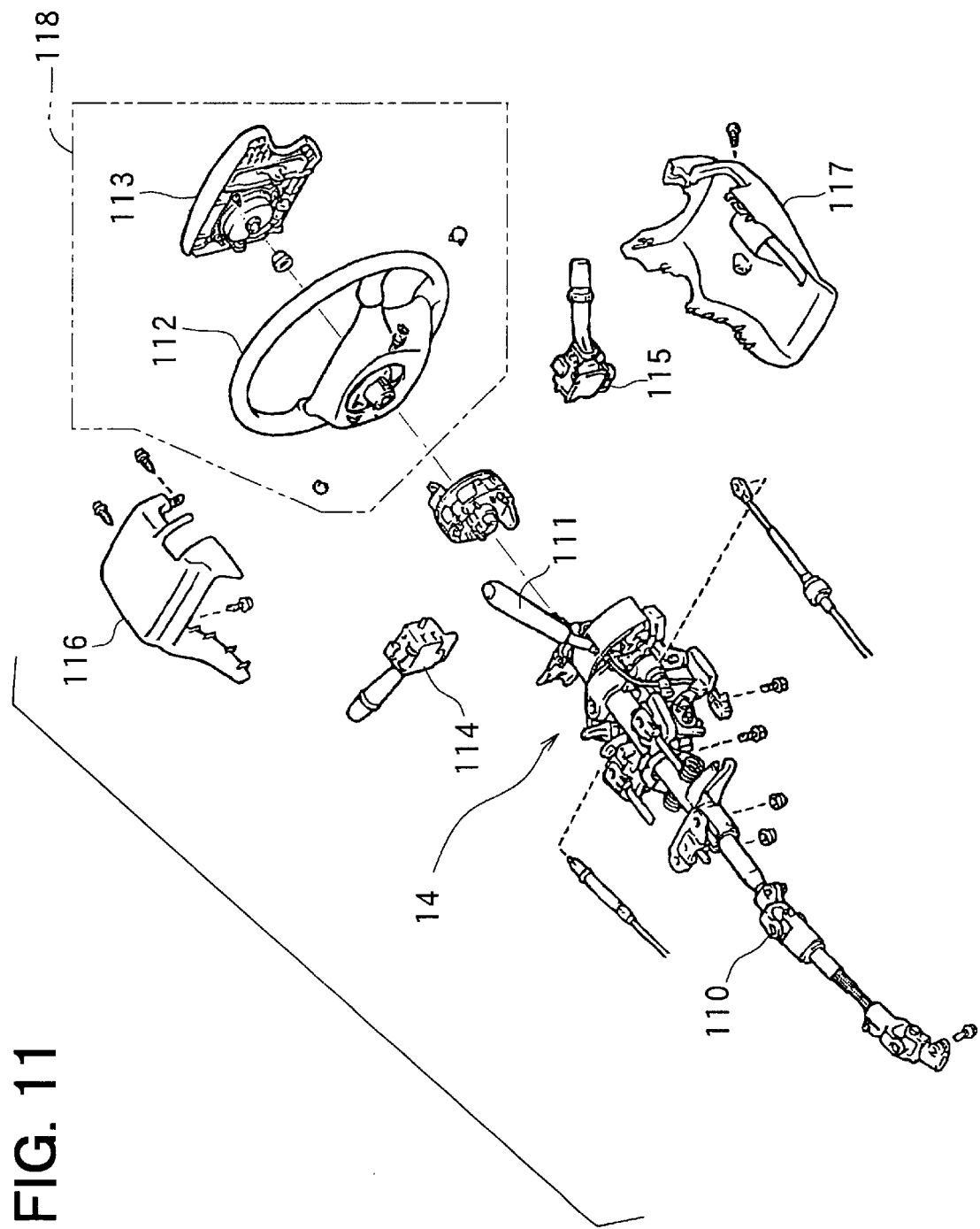
FIG. 11 is an exploded perspective view of a steering sub module of the first embodiment of the invention.
Figure 12:
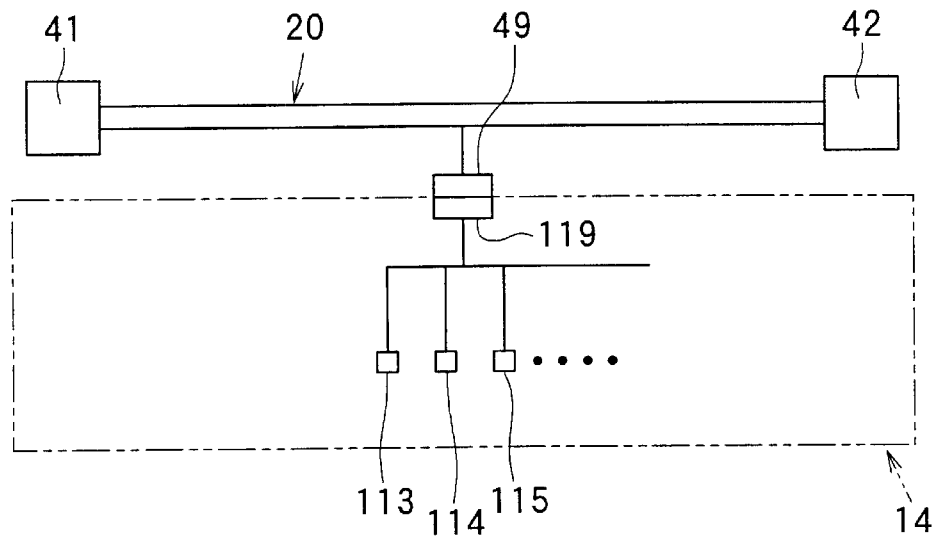
FIG. 12 is an electric schematic view of the steering sub module of the first embodiment of the invention.
Figure 14:
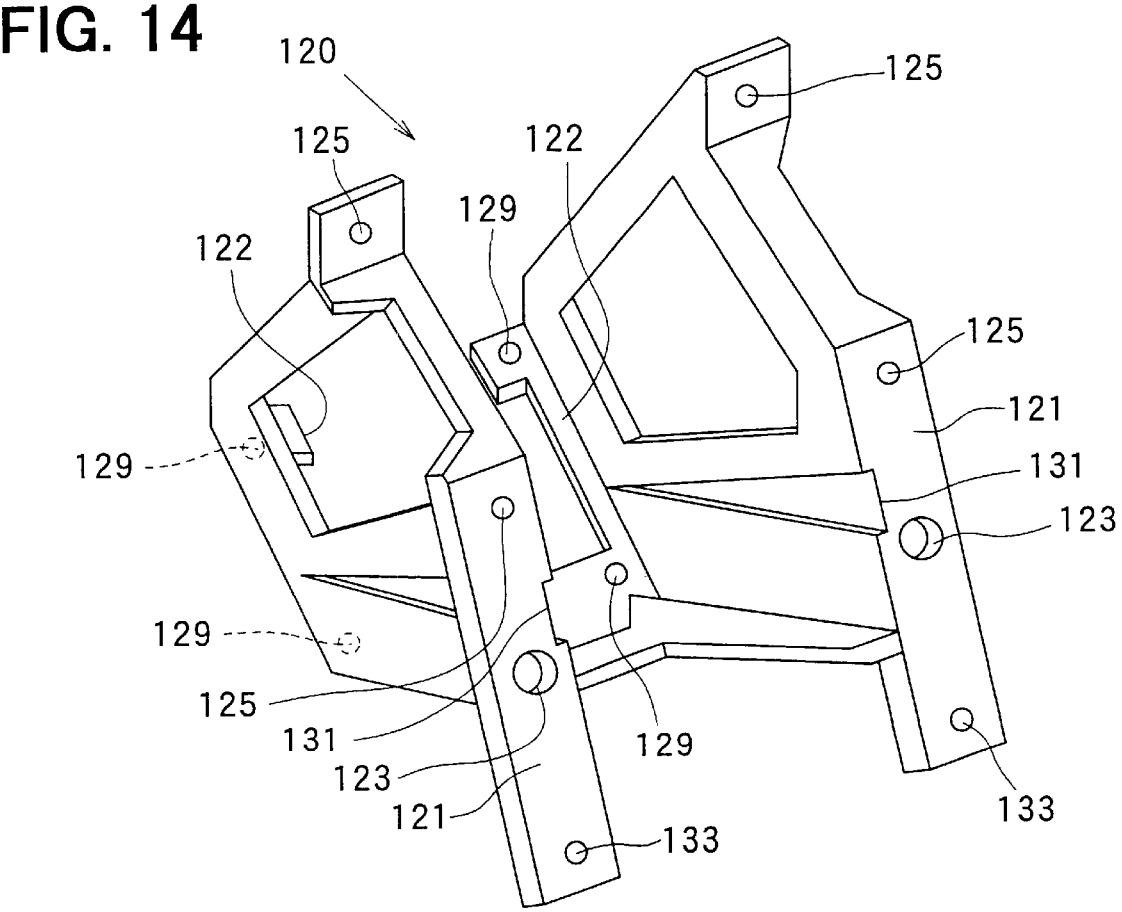
FIG. 14 is a perspective view of a guide bracket used in the first embodiment of the invention.

Respective parts shown in FIG. 11 are assembled to an integral structure which constitutes the steering sub module 14. In this sub module 14, portions of the steering column upper cover 116 are supported by the support stays 32 of the reinforcing member 18 of the air-conditioning sub module 10. FIG. 12 shows the electric connection at the steering sub module 14, wherein the connecting portions of the horn switching portion 113, the lighting switch 114, the wiper switch 115 and the like are united at a portion to form a unitary connector portion 119 in a collective manner. Further, when the steering wheel 112 is provided with a driver-seat side air bag device, an electric circuit portion of the driver-seat side air bag device is connected to a dedicated connector portion or the above-mentioned unitary connector portion 119. The electric connections shown in FIG. 12 are completed in the course of the assembling step of the steering sub module 14.

The above-mentioned unitary connector portion 119 is connected with the connector 49 branched from the integrated electric wiring bundle 20 of the air-conditioning sub module 10.

(6) Subsequently, the manner of assembling the cockpit module assembly is explained. In this embodiment, five sub module assemblies 10–14 shown in FIG. 1 are respectively assembled as single units and thereafter these five sub module assemblies 10–14 are mutually assembled. To be more specific, in the air conditioning sub module 10, the stays 32,33 of the reinforcing member 18 and the side brackets 34, 35 constitute the variation portion which can be changed corresponding to the vehicle type and hence, the mechanical assembling of other parts excluding the variation portion (that is, the mechanical assembling of the standard portion) is performed and simultaneously the electric connection in the inside of the air-conditioning sub module 10 can be completed.

Further, in the meter sub module 12, the mechanical assembling and the electric connection of a standard circuit portion 75 and a unitary connector 75a which constitute the standard portion are performed. Further, in the center cluster module 13, the mechanical assembling of respective parts 90–94 inside the standard portion 89 and the electric connection of the respective parts 90–94 with the unitary connector 100 are performed. Further, in the steering sub module 14, the assembling of other parts excluding the parts 112, 113 which constitute the variation portion 118 (that is, the assembling of the standard portion) is performed and the electric connection of the standard portion inside the steering sub module 14 is performed.

Then, in the instrument design panel sub module 11, the mechanical assembling of respective parts of the sub module 11 to the instrument panel 15 is performed and simultaneously the electric connection in the inside of the sub module 11 is completed. Since the instrument design panel sub module 11 constitutes the variation portion for the vehicle type, once the part or component constitution of the instrument design panel sub module 11 is determined, the variation portions of other sub modules 10, 12, 13, 14 can be determined correspondingly.

Then, as a subsequent step, the mechanical assembling of the variation portion of each sub module 10, 12, 13, 14 is performed and simultaneously, the electric connection of the variation portion is performed in each sub module 10, 12, 13, 14. Due to such a constitution, the electric connection can also be completed inside the sub modules 12, 13, 14.

Subsequently, mechanical assembling among five sub modules 10–14 is performed and simultaneously the electric connection among the five sub modules 10–14 is performed thus assembling the cockpit module. Thereafter, the assembled cockpit module assembly is mounted on a vehicle on a vehicle assembly line.

Figure 13A:
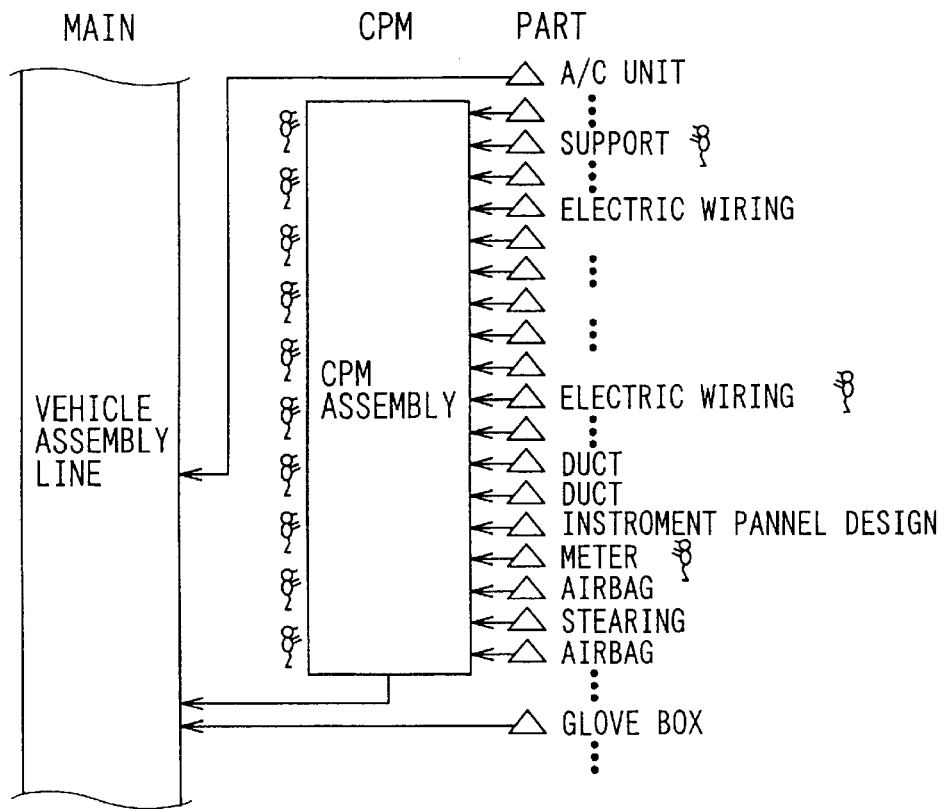
FIG. 13A is a schematic view of a cockpit module assembling method of the prior art.
Figure 13B:
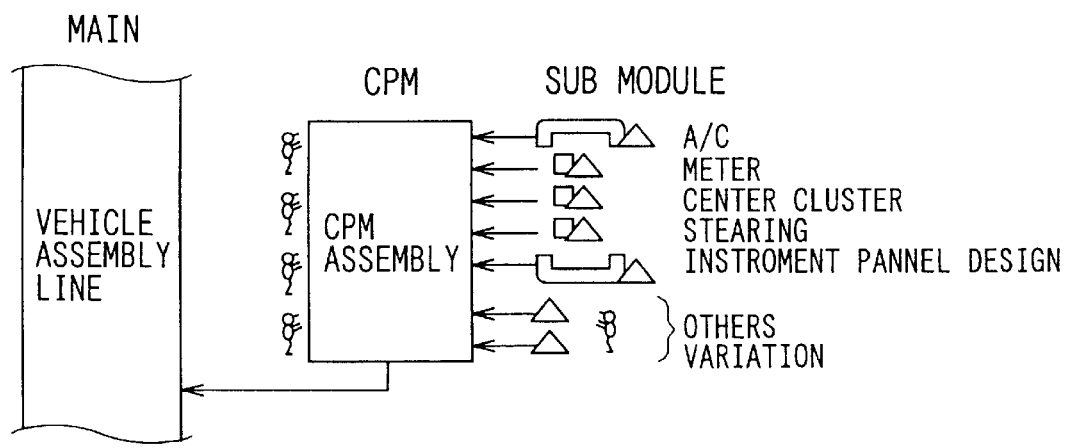
FIG. 13B is a schematic view of a cockpit module assembling method of the first embodiment of the invention.

FIG. 13B is an explanatory view summarizing the above-mentioned assembling method. Since each sub module 10–14 completes respective assembling when the function thereof is completed before the cockpit module assembly is assembled, the man-hours of the assembling line for the cockpit module assembly can be drastically reduced compared with a conventional method shown in FIG. 13A. CPM in FIG. 13 indicates the cockpit module assembly.

The mechanical assembling and the electric connection of the variation portion at each sub module 10, 12, 13, 14 may be partially or wholly performed during assembly of the cockpit module assembly instead of before assembling the cockpit module assembly. Further, while excluding the assembling of the steering sub module 14 to the cockpit module assembly outside the vehicle assembly line, the steering sub module 14 may be assembled to the cockpit module assembly and the vehicle side on the vehicle assembling line.

(7) Subsequently, the manner of mutually assembling the sub modules is specifically explained using the center cluster sub module 13 as an example. In FIG. 14–FIG. 19, a guide bracket 120 constitutes a variation portion which has a dimension and shape corresponding to the vehicle type. The guide bracket 120 is made of metal or resin and is integrally provided with left and right instrument-panel side securing surfaces 121 which are fixedly secured to the center cluster mounting portion 62 of the instrument panel 15. The device also has left and right air-conditioning side securing surfaces 122 which are fixedly secured to the air-conditioning unit 17 side.

Figure 15:
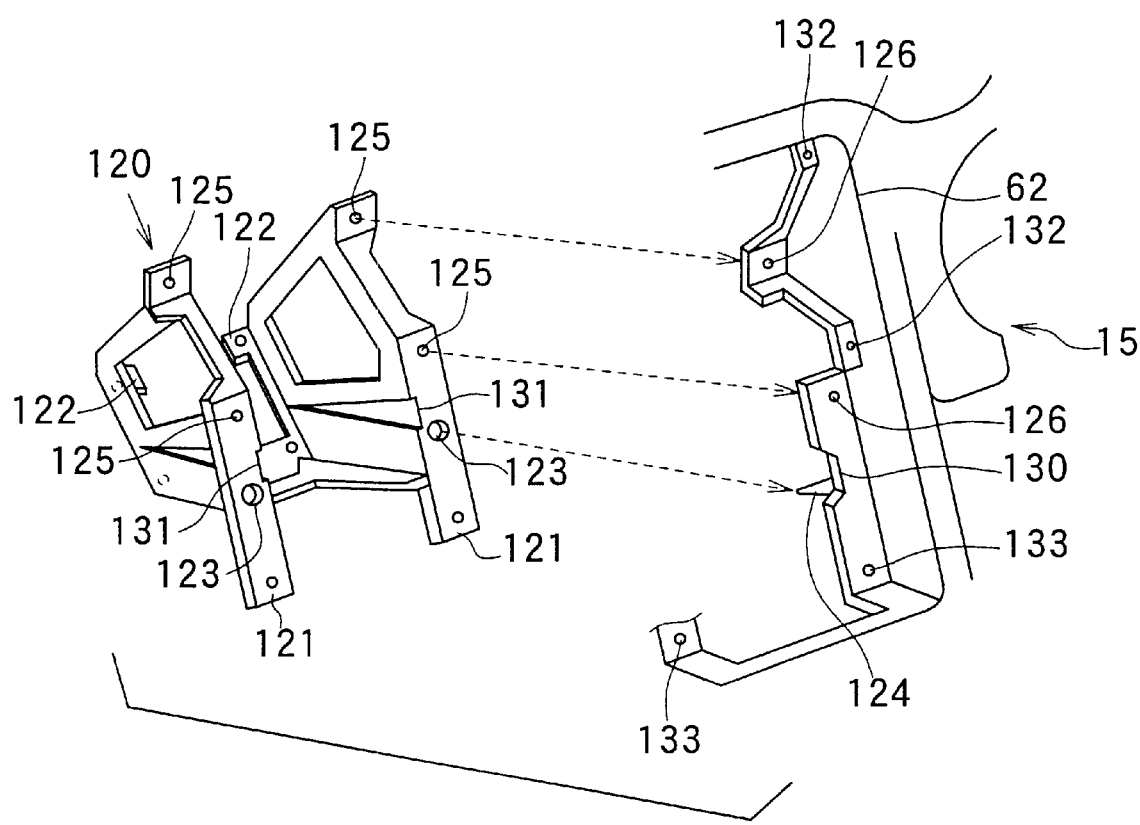
FIG. 15 is a perspective environmental view for explaining the assembling of the guide bracket of FIG. 14.
Figure 16:
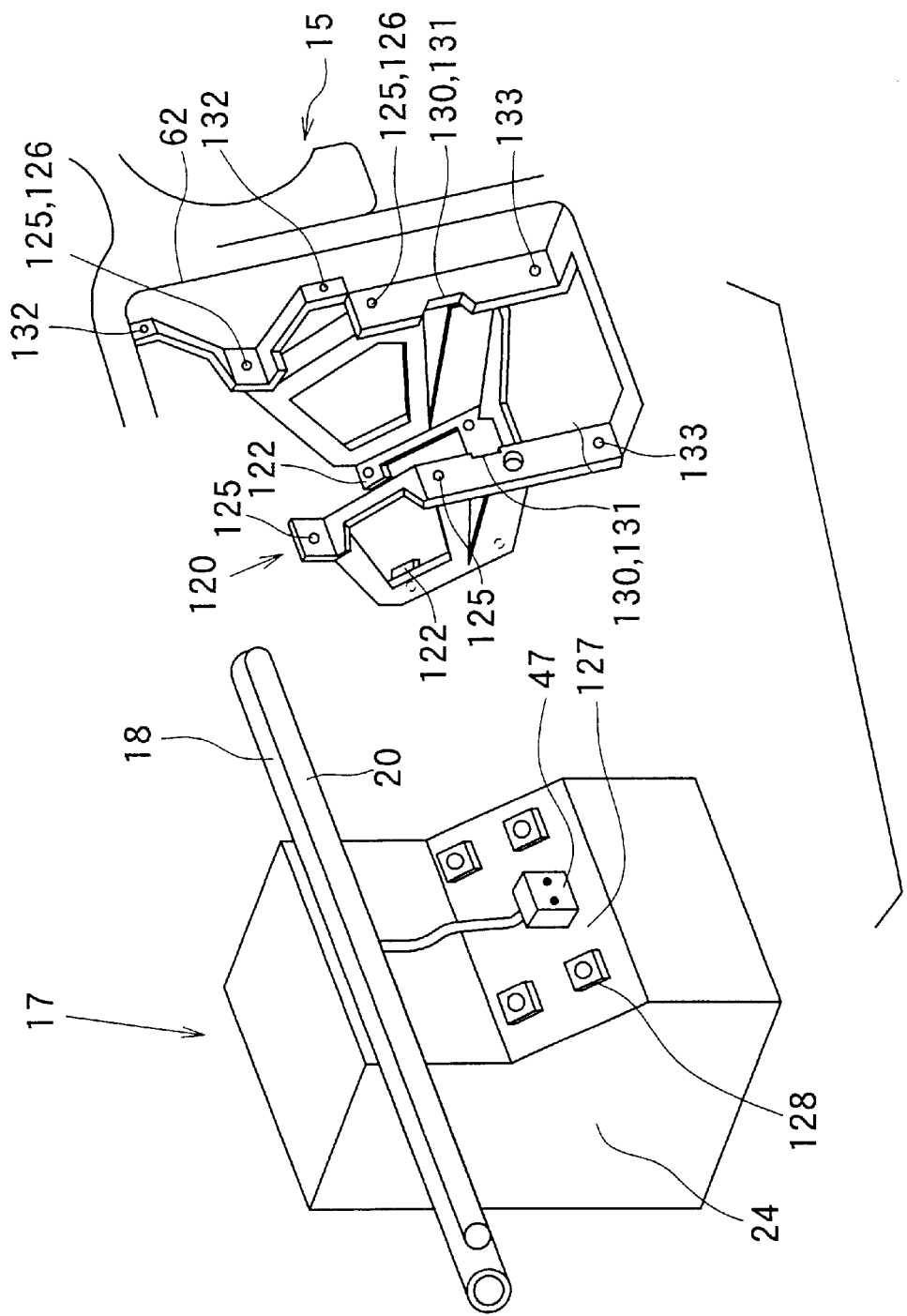
FIG. 16 is a perspective environmental view for the assembling of the guide bracket of FIG. 14.

As a first step, the guide bracket 120 is fixedly secured to the instrument panel 15 side. More specifically, as shown in FIG. 15, by engaging the positioning holes 123 formed in two left and right portions of the instrument-panel-side securing surfaces 121 with positioning pins 124 of the center cluster mounting portion 62 by a fit-into engagement, the positioning of the guide bracket 120 to the instrument panel 15 is performed. Accordingly, the mounting holes 125 of the guide bracket 120 and the mounting holes 126 of the instrument panel side can be superposed or aligned with each other as shown in FIG. 16.

Subsequently, the superposed portions of both mounting holes 125, 126 are fastened by screw to fixedly secure the guide bracket 120 to the center cluster mounting portion 62 of the instrument panel 15 by fastening. Here, as shown in FIG. 16, a center cluster mounting surface 127 is formed on a vehicle rear side of the case 24 of the air conditioning unit 17 and a plurality (four in the illustrated embodiment) of standard mounting seat surfaces 128 corresponding to the center cluster sub module 13 are formed on the center cluster mounting surface 127.

Then, as a second step, the guide bracket 120 is fixedly secured to the air-conditioning unit 17 side using this standard mounting seat surfaces 128. More specifically, mounting holes 129 respectively formed in the standard mounting seat surfaces 128 and the air-conditioning side securing surfaces 122 of the guide bracket 120 are aligned, and simultaneously, between the left and right air-conditioning side securing surfaces 122 of the guide brackets 120 (central of the center cluster mounting surface 127), the connector 47, branching from the integrated electric wiring bundle 20, is positioned and is fixedly secured thereto. Due to this construction, connector 47 can be used as a standby connector.

Figure 17:
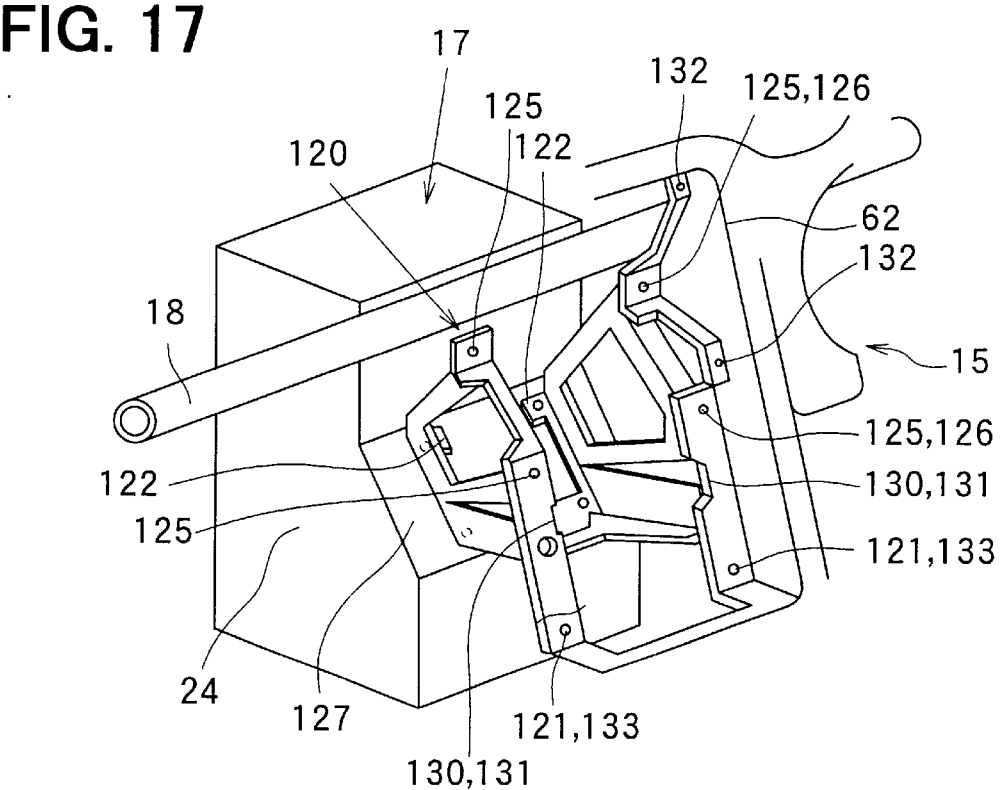
FIG. 17 is a perspective view for the assembling of the guide bracket of FIG. 14.
Figure 19:
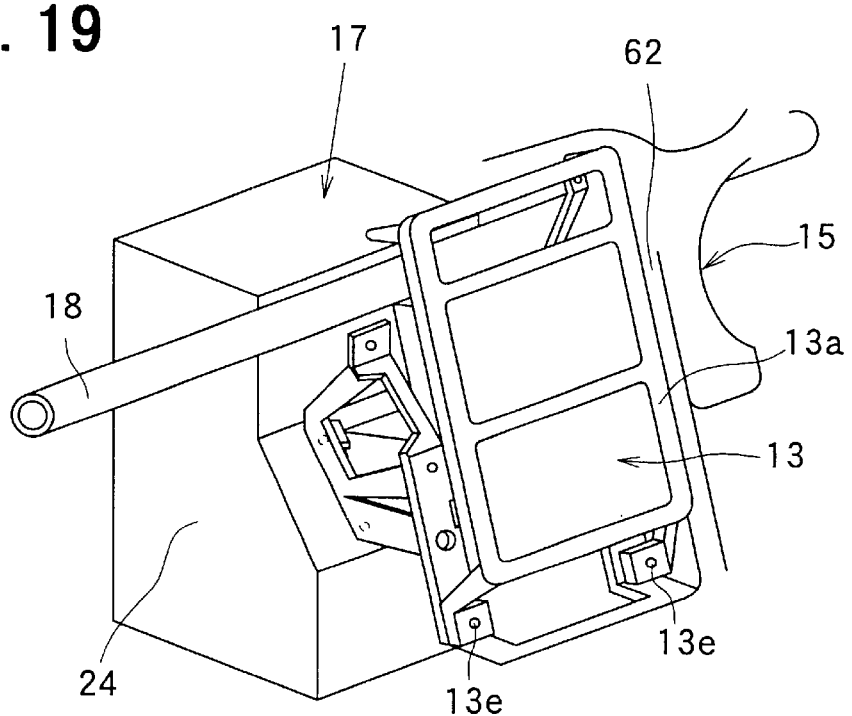
FIG. 19 is a perspective view for the assembling of the center cluster sub module of the invention.

As in FIG. 1, when the rear seat foot blow-out ducts 30 are provided to the vehicle rear side of the case 24, vehicle rear side surfaces of the rear seat foot blow-out ducts 30 are the center cluster mounting surfaces 127 and the connector 47 may be positioned and fixedly secured between the left and right rear seat foot blow-out ducts 30. Then, the mounting hole 129 portion of the air-conditioning side fixing surface 122 of the guide bracket 120 is fastened to the standard mounting seat surface 128 of the case 24 by means of screw means to fasten and fixedly secure the guide bracket 120 to the air-conditioning unit 17. FIG. 17 shows the state after fastening operation.

Figure 18:
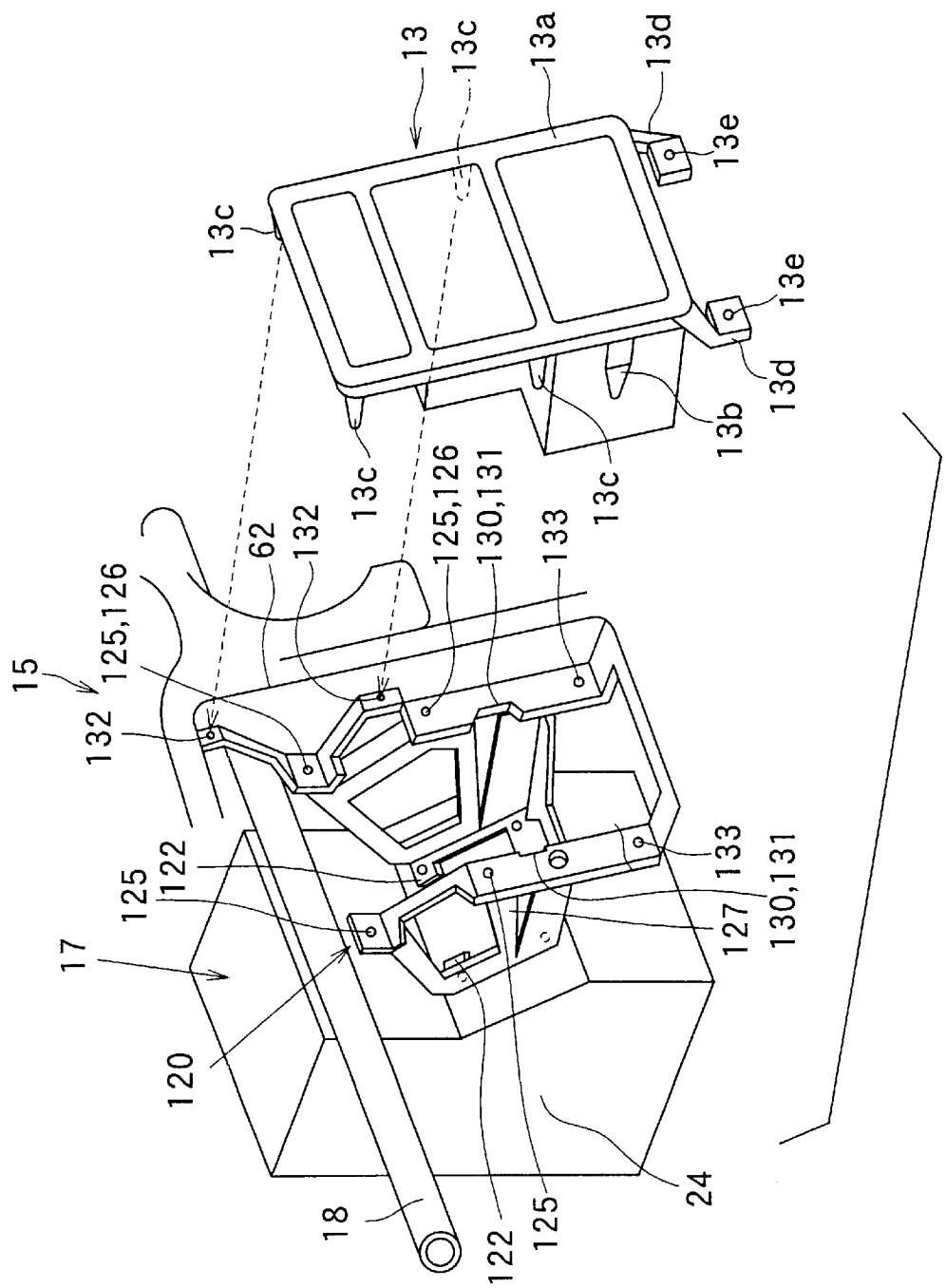
FIG. 18 is a perspective view for explaining the assembling of the center cluster sub module of the invention.

Subsequently, as a third step, securing the center cluster sub module 13 is performed. More specifically, as shown in FIG. 18, two left and right guide protruding portions 13b (only one left-side portion shown in FIG. 18) formed on a resin-made frame portion 13a of the center cluster sub module 13 are fit into guide recessed portions 130, 131 formed in the center cluster mounting portion 62 and the guide bracket 120 of the instrument panel 15 to position the center cluster sub module 13 to the instrument panel 15. Simultaneously, clips 13c provided to four portions, at the upper portion of the frame portion 13a, are inserted into the mounting holes 132 of the center cluster mounting portion 62. Here, the distal end portions of the clips 13c have an engaging pawl shape which can be resiliently deformed.

In this manner, in the step for inserting the center cluster sub module 13 into the center cluster mounting portion 62 side of the instrument panel 15, the unitary connector 100 of the center cluster sub module 13 is fit to and mounted on the standby connector 47 of the case 24 side. Here, in FIGS. 17–19, the illustration of the integrated electric wiring bundle 20 and the connector 47 is omitted for simplifying the drawings.

Subsequently, mounting holes 13e of a standard mounting portion 13d formed on a lower end portion of the frame portion 13a are fastened to mounting holes 133 of the center cluster mounting portion 62 by screw means (not shown in the drawing) or the like. Due to such a constitution, the center cluster sub module 13 can be fixedly secured to the center cluster mounting portion 62 of the instrument panel 15. Further, the center cluster mounting portion 62 of the instrument panel 15 can be fixedly secured to the case (weight supporting structural body) 24 of the air conditioning unit 17.

Since the instrument panel 15 is a physically large member, the instrument panel 15 is also fixedly secured to the side brackets 34, 35 of both left and right end portions of the reinforcing member 18 by way of the guide bracket 120.

Second Embodiment

Although the example in which the air-conditioning sub module 10 which constitutes the weight supporting structural body is provided with the air-conditioning indoor unit which includes the blower unit 16 and the air-conditioning unit 17 has been explained in the above-mentioned first embodiment, the air-conditioning indoor unit portion may be separated from the air-conditioning sub module 10 which constitutes the weight supporting structural body and the air-conditioning sub module 10 which constitutes the weight supporting structural body may be constructed by the reinforcing member 18, the air conditioning duct 19 and the like.

In this case, the air-conditioning indoor unit is mounted on the vehicle in advance separately from the cockpit module assembly.

Third Embodiment

Although the example in which the air-conditioning duct portion 19 is incorporated into the air-conditioning sub module 10 has been explained in the above-mentioned first embodiment, the air-conditioning duct portion 19 may be separated from the air-conditioning sub module 10 and may be incorporated into the instrument design panel sub module 11.

As can be understood from the explanation of the above-mentioned first to third embodiments, it is sufficient for the weight supporting structural body sub module to include at least one of the air-conditioning indoor unit portion, the steering supporting reinforcing member 18 and the air-conditioning duct portion 19.

Fourth Embodiment

In the above-mentioned first embodiment, the five sub module assemblies 10–14 consisting of the air-conditioning sub module 10, the instrument panel design sub module 11, the meter sub module 12, the center cluster sub module 13 and the steering sub module 14 are assembled as units respectively and thereafter these five sub module assemblies 10–14 are mutually assembled. However, for example, three sub modules consisting of the instrument panel design sub module 11, the meter sub module 12 and the center cluster sub module 13 may be unitarily formed into one sub module assembly and thereafter the assembling of the whole cockpit module assembly may be performed.

While the above-described embodiments refer to examples of usage of the present invention, it is understood that the present invention may be applied to other usage, modifications and variations of the same, and is not limited to the disclosure provided herein.

What is claimed is:

1. A vehicular cockpit module assembly method for assembling an instrument panel and peripheral devices as a single assembly, comprising the steps of:

dividing the instrument panel and the peripheral devices into a plurality of sub module assemblies, said sub module assemblies including an instrument panel design sub module assembly, a meter sub module assembly, a center cluster sub module assembly and a steering sub module assembly, each said sub module assemblies having a corresponding main device;

assembling each of the sub module assemblies as a unit before assembling the sub module assemblies into said single assembly;

providing a single electrical connector on each of said sub module assemblies; and connecting each of said single electrical connector on each of said sub module assemblies to a single integrated wiring bundle; wherein at least one of the sub module assemblies is completely electrically connected therein; and connecting portions are provided for connecting with external wiring at given portions in a collective manner.

2. A vehicular cockpit module assembly for assembling an instrument panel and its peripheral devices into a single assembly, the instrument panel and the peripheral devices being divided into a plurality of sub module assemblies, each of the sub module assemblies having a corresponding main device, the sub module assemblies numbering at least four and comprising:

an instrument panel design sub module assembly;

a meter sub module assembly located proximate to said instrument panel design sub module assembly;

a center cluster sub module assembly located proximate to said meter sub module assembly; and a steering sub module assembly located proximate to said center cluster sub module assembly; each of the sub module assemblies comprising:

a standard portion which includes a standard assembly portion for the mutual assembly of sub module assemblies;

a standard electric circuit portion;

a single electrical connecting portion for connecting the standard electric circuit portion with a single integrated wiring bundle; and a variation portion which is constituted separately from the standard portion and is assembled to the standard portion.

3. The vehicular cockpit module assembly according to claim 2, wherein:

the plurality of sub module assemblies have design portions viewed from the inside of a cabin; and one sub module assembly serves as a weight support structural body for supporting weight of the sub module assemblies.

4. A vehicular cockpit module assembly according to claim 3, wherein the sub module assembly serving as a weight support structural body comprises at least an air-conditioning indoor unit portion, a reinforcing member for supporting a steering device, or an air-conditioning duct portion.

5. The vehicular cockpit module assembly according to claim 4, wherein the sub module assembly serving as a weight supporting structural body comprises:

the single integrated wiring bundle having a number of electric wires integrated into one bundle; and electric distribution portions attached to the single integrated wiring bundle.

6. The vehicular cockpit module assembly according to claim 2, wherein the plurality of sub module assemblies further comprises:

an air-conditioning sub module assembly serving as a weight supporting structural body which includes air-conditioning indoor unit portions, and a reinforcing member for supporting a steering device; wherein said instrument panel design sub module assembly includes an instrument panel;

said meter sub module assembly includes meters for indicating drive conditions of a vehicle;

said center cluster sub module assembly is positioned approximately central in a lateral direction of the instrument panel, the center cluster sub module assembly having a plurality of devices including an audio device or a navigation device; and said steering sub module assembly includes a steering device.

7. A method for assembling a vehicular cockpit module assembly for assembling an instrument panel and peripheral devices as a single assembly, comprising the steps of:

assembling sub assemblies of the instrument panel and peripheral devices into a plurality of sub module assemblies including an instrument panel design sub module assembly, a meter sub module assembly, a center cluster sub module assembly and a steering sub module assembly in a sub assembly step, each sub assembly has a corresponding main device; and assembling the sub module assemblies into a whole assembly in the sub assembly step in a whole assembly step;

wherein at least one of the plurality of sub module assemblies comprises:

a standard portion having a standard assembly portion for mutually assembling the sub module assemblies, a standard electric circuit portion, a single electrical connecting portion for connecting the standard electric circuit portion with a single integrated wiring bundle; and a variation portion which is separate from the standard portion and is assembled to the standard portion;

wherein only the standard portion is assembled in the sub assembling step, the variation portion being assembled to the standard portion before or during the assembling step.

8. A vehicle cockpit module assembly comprising:

an instrument panel;

a single electric wiring bundle being disposed adjacent said instrument panel, said single electric wiring bundle being the only electric wiring bundle associated with said instrument panel, said single electric wiring bundle having a plurality of bundle connectors;

a plurality of sub module assemblies assembled to said instrument panel, each of said plurality of sub module assemblies having a main device, an electric circuit portion and a module connector, each module connector being electrically connected to a respective bundle connector; and an electrical distribution box located at each end of said single electrical wiring bundle, said electrical distribution boxes distributing electrical signals and electricity, said module connectors being disposed between said electrical distribution boxes.

9. The vehicle cockpit module assembly according to claim 8 wherein one of said sub module assemblies includes a weight supporting structure for supporting said plurality of sub module assemblies.

10. The vehicle cockpit module assembly according to claim 9 wherein said one sub module assembly is an air-conditioning unit.

11. The vehicle cockpit module assembly according to claim 10 wherein said single electric wiring bundle is attached to said air-conditioning unit.

12. The vehicle cockpit module assembly according to claim 8 wherein said plurality of sub module assemblies include an air-conditioning unit, a meter unit, a center cluster unit and a steering unit.

* * * * *